US011631859B2

(12) United States Patent
Oh et al.

(10) Patent No.: US 11,631,859 B2
(45) Date of Patent: Apr. 18, 2023

(54) ANODE MATERIAL FOR LITHIUM SECONDARY BATTERIES AND METHOD OF MANUFACTURING THE SAME

(71) Applicants: HYUNDAI MOTOR COMPANY, Seoul (KR); KIA CORPORATION, Seoul (KR); INCHEON NATIONAL UNIVERSITY RESEARCH & BUSINESS FOUNDATION, Incheon (KR)

(72) Inventors: Seung Min Oh, Incheon (KR); Ik Kyu Kim, Gwangmyeong-si (KR); Yeol Mae Yeo, Hwaseong-si (KR); Yoon Sung Lee, Suwon-si (KR); Ji Eun Lee, Hwaseong-si (KR); Sa Heum Kim, Suwon-si (KR); Dong Jun Kim, Seongnam-si (KR); Nam Hyeong Kim, Gimcheon-si (KR); Jun Young Mun, Incheon (KR); Yeong Don Park, Seoul (KR); Su Hyun Lee, Incheon (KR); Jun Hwa Park, Incheon (KR); Mei Hua Hong, Incheon (KR)

(73) Assignees: HYUNDAI MOTOR COMPANY, Seoul (KR); KIA CORPORATION, Seoul (KR); INCHEON NATIONAL UNI. RESEARCH & BUSINESS FDN, Incheon (KR)

( * ) Notice: Subject to any disclaimer, the term of this patent is extended or adjusted under 35 U.S.C. 154(b) by 190 days.

(21) Appl. No.: 17/337,098

(22) Filed: Jun. 2, 2021

(65) Prior Publication Data
US 2022/0149380 A1 May 12, 2022

(30) Foreign Application Priority Data

Nov. 9, 2020 (KR) .................. 10-2020-0148477

(51) Int. Cl.
*H01M 4/62* (2006.01)
*H01M 4/36* (2006.01)
(Continued)

(52) U.S. Cl.
CPC .......... *H01M 4/628* (2013.01); *H01M 4/366* (2013.01); *H01M 4/483* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2017/0012325 A1* 1/2017 Zhu .................. H01M 10/0525

FOREIGN PATENT DOCUMENTS

KR     2014-0032831 A    3/2014
KR     10-1510715 B1    4/2015

* cited by examiner

*Primary Examiner* — Wyatt P McConnell
(74) *Attorney, Agent, or Firm* — McDonnell Boehnen Hulbert & Berghoff LLP

(57) ABSTRACT

Disclosed are an anode material for lithium secondary batteries, the anode material including an Si-based anode active material and a film layer formed as a double self-assembled monolayer as the result of an amino trimethoxy silane (ATS) SAM precursor and a fluoro ethylene carbonate (FEC) SAM precursor being sequentially bonded to the surface of the Si-based anode active material, and method of manufacturing the same.

10 Claims, 10 Drawing Sheets

(51) Int. Cl.
*H01M 10/0525* (2010.01)
*H01M 4/48* (2010.01)
*H01M 4/02* (2006.01)

ANODE MATERIAL FOR LITHIUM SECONDARY BATTERIES AND METHOD OF MANUFACTURING THE SAME

CROSS REFERENCE TO RELATED APPLICATIONS

This application claims the benefit of Korean Patent Application No. 10-2020-0148477, filed on Nov. 9, 2020, with the Korean Intellectual Property Office, the disclosure of which is herein incorporated by reference in its entirety.

BACKGROUND

1. Field

The present disclosure relates to an anode material for lithium secondary batteries and a method of manufacturing the same, and more particularly to an anode material for lithium secondary batteries including a film layer formed as a double self-assembled monolayer as the result of primary bonding of an amino trimethoxy silane (ATS) SAM precursor and secondary bonding of a fluoro ethylene carbonate (FEC) SAM precursor and a method of manufacturing the same.

2. Description of the Related Art

A lithium secondary battery is used as a power supply source for smartphones, laptop computers, hybrid electric vehicles, or electric vehicles. The lithium secondary battery has advantages in that the lithium secondary battery is rechargeable, energy density of the lithium secondary battery is higher than that of a lead battery or a nickel hydride battery, and the lithium secondary battery is chargeable at high output and high speed.

The lithium secondary battery includes a cathode configured to provide lithium at the time of charging, an anode configured to receive lithium, an electrolyte configured to serve as a transmission path of lithium ions, and a separator configured to separate the cathode and the anode from each other so as to prevent contact therebetween.

At the time of discharging, electrical energy is generated due to a change in chemical level when lithium ions are deintercalated from the anode and intercalated into the cathode.

When the lithium secondary battery is repeatedly charged and discharged, however, cathode and anode materials are repeatedly contracted and expanded, whereby the structures of the cathode and the anode are changed and become different from the initial structures thereof. As a result, electrochemical properties, such as capacity and output, of the battery cannot be maintained at the initial state.

Therefore, there is a need to protect a cathode and an anode, thereby improving electrochemical properties thereof and maximally maintaining the initial states thereof even when charging and discharging are repeated.

The matters disclosed in this section are merely for enhancement of understanding of the general background of the disclosure and should not be taken as an acknowledgment or any form of suggestion that the matters form the related art already known to a person skilled in the art.

SUMMARY

It is an object of the present disclosure to provide an anode material for lithium secondary batteries capable of improving electrochemical properties of a lithium secondary battery and a method of manufacturing the same.

In accordance with an aspect of the present disclosure, the above and other objects can be accomplished by the provision of an anode material for lithium secondary batteries, the anode material including an Si-based anode active material and a film layer formed as a double self-assembled monolayer as the result of an amino trimethoxy silane (ATS) SAM precursor and a fluoro ethylene carbonate (FEC) SAM precursor being sequentially bonded to the surface of the Si-based anode active material.

The ATS SAM precursor may be represented by Chemical Formula 1, shown below.

Chemical Formula 1

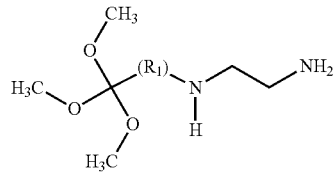

In Chemical Formula 1 above, $R_1$ indicates a linear or branched alkylene group having a carbon number of 3 to 5.

The Si-based anode active material may be one or more of Si, SiO, and an Si alloy.

A contact angle on the surface of the anode material may be less than 61.56°.

In accordance with another aspect of the present disclosure, there is provided a method of manufacturing an anode material for lithium secondary batteries, the method including a preparation step of preparing an Si-based anode active material, an amino trimethoxy silane (ATS) SAM precursor, and a fluoro ethylene carbonate (FEC) SAM precursor and a film formation step of sequentially bonding the ATS SAM precursor and the FEC SAM precursor to the surface of the prepared Si-based anode active material to form a double self-assembled monolayer as a film layer.

In the preparation step, the Si-based anode active material may be one or more of Si, SiO, and an Si alloy, and the ATS SAM precursor may be a compound represented by Chemical Formula 1, above, where $R_1$ indicates a linear or branched alkylene group having a carbon number of 3 to 5. In Chemical Formula 1 above, $R_1$ indicates a linear or branched alkylene group having a carbon number of 3 to 5.

In the film formation step, the ATS SAM precursor and the FEC SAM precursor may be bonded to each other using a dip-coating method.

Specifically, the film formation step using the dip-coating method may include a first stirring process of mixing the Si-based anode active material with toluene and stirring the same, a second stirring process of mixing the ATS SAM precursor with the mixture stirred in the first stirring process and stirring the same, a first filtration process of filtering an excess of toluene from the mixture stirred in the second stirring process, a first heat treatment process of annealing the mixture, from which the excess of toluene is filtered, in a vacuum oven to form a film having an ATS SAM precursor ingredient on the surface of the Si-based anode active material, a third stirring process of mixing the Si-based anode active material having the film having the ATS SAM precursor ingredient formed on the surface thereof with toluene and stirring the same, a fourth stirring process of mixing the mixture stirred in the third stirring process with the FEC SAM precursor and stirring the same, a second filtration process of filtering an excess of toluene from the mixture stirred in the fourth stirring process, and a second heat treatment process of annealing the mixture, from which the excess of toluene is filtered, in a vacuum oven to form a film having an FEC SAM precursor ingredient on the surface of the Si-based anode active material having the film having the ATS SAM precursor ingredient formed on the surface thereof.

In the film formation step, the ATS SAM precursor and the FEC SAM precursor may be bonded to each other using a vapor deposition method.

The film formation step using the vapor deposition method may include a first deposition process of depositing an ATS SAM precursor ingredient on the surface of the Si-based anode active material under a vacuum condition, a first heat treatment process of annealing the Si-based anode active material having the ATS SAM precursor ingredient deposited on the surface thereof in a vacuum oven to form a film having the ATS SAM precursor ingredient on the surface of the Si-based anode active material, a second deposition process of depositing an FES SAM precursor ingredient on the surface of the Si-based anode active material having the film having the ATS SAM precursor ingredient formed on the surface thereof under a vacuum condition, and a second heat treatment process of annealing the Si-based anode active material having the FEC SAM precursor ingredient deposited on the surface thereof in a vacuum oven to form a film having the ATS SAM precursor ingredient and the FEC SAM precursor ingredient sequentially deposited on the surface of the Si-based anode active material.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings. However, the present disclosure is not limited to the embodiments disclosed below and may be implemented in various different forms, and the embodiments herein are provided to make the disclosure of the present disclosure complete and to fully convey the scope of the disclosure to those skilled in the art.

Figure 1:
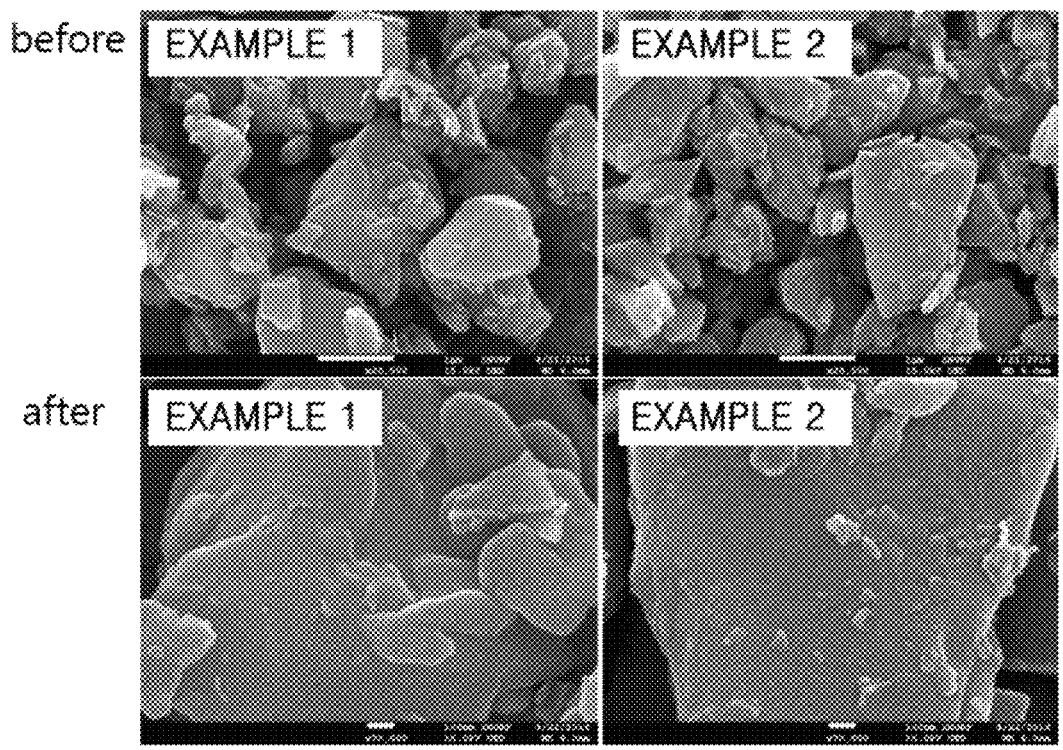
FIG. 1 is a photograph showing comparison between the surfaces of anode active materials manufactured according to Examples before and after SEM photographing.
Figure 2:
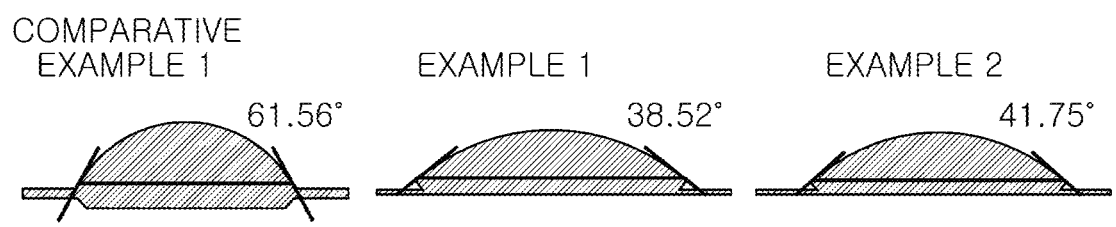
FIG. 2 is a view showing the contact angle of an SAM on each of the surfaces of anode active materials manufactured according to Comparative Example and Examples.
Figure 3:
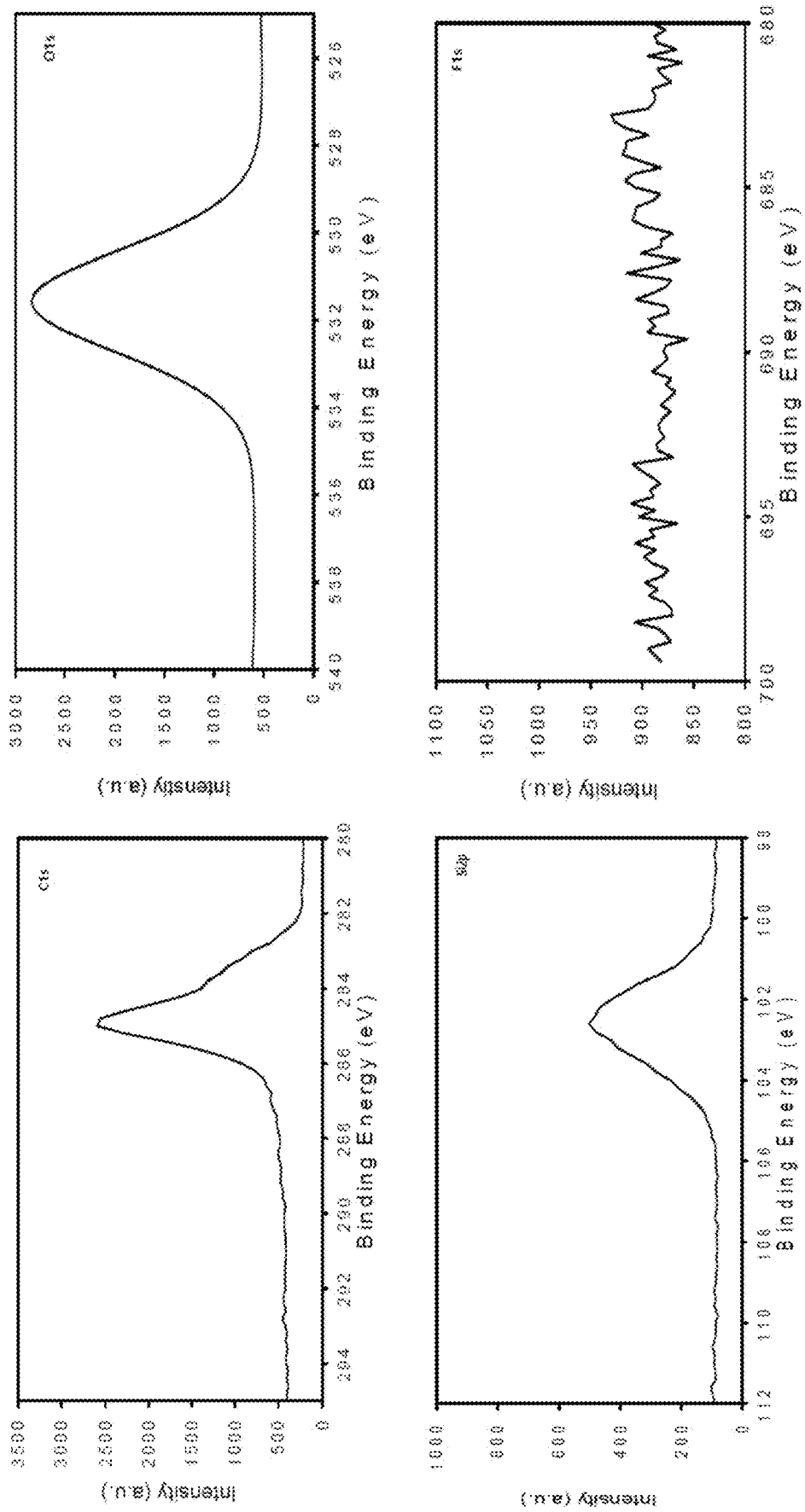
FIG. 3 is a graph showing the surfaces of anode active materials according to Comparative Example 1 and Example 1 analyzed using an XPS analysis method.
Figure 3:
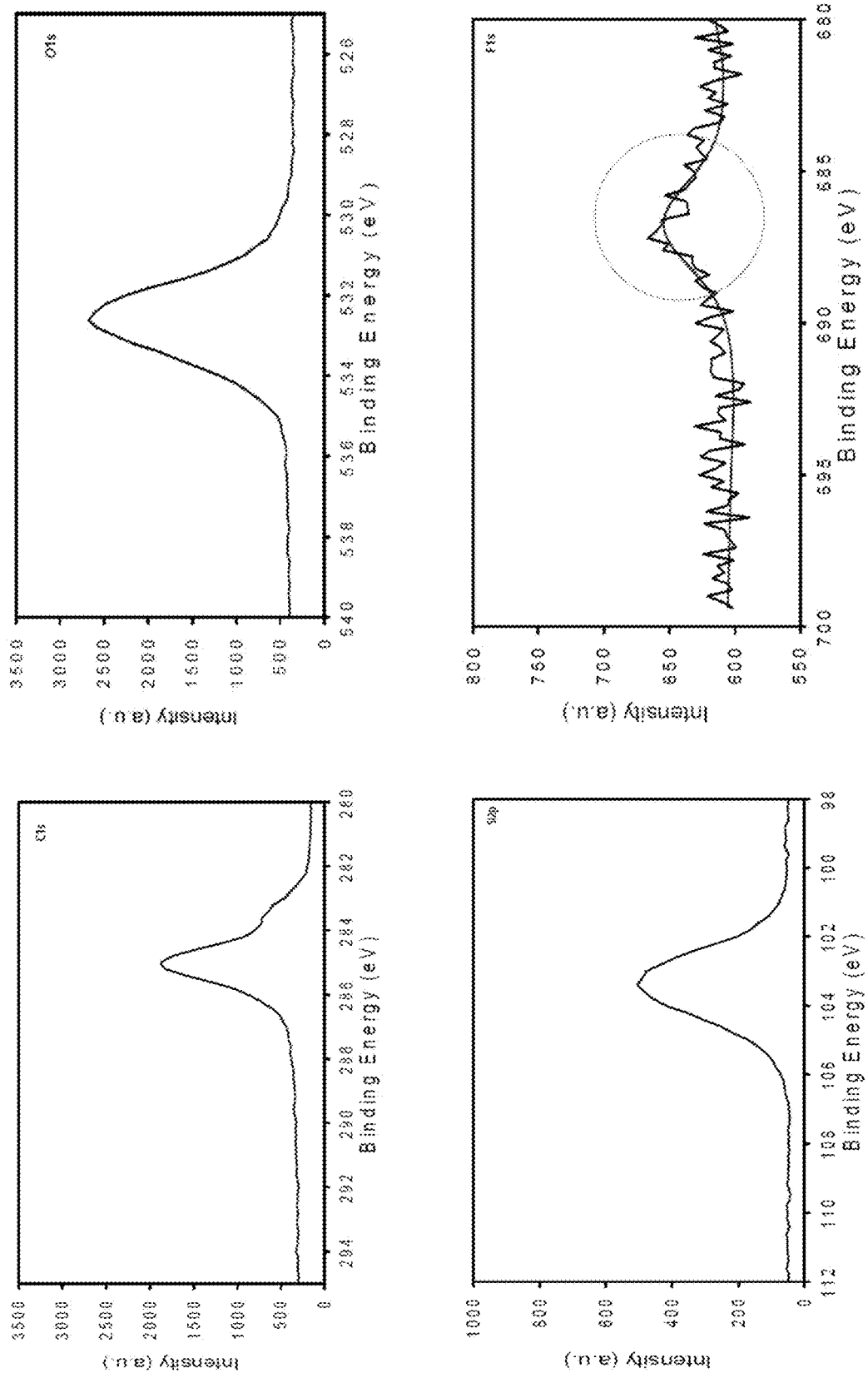
Figure 4A:
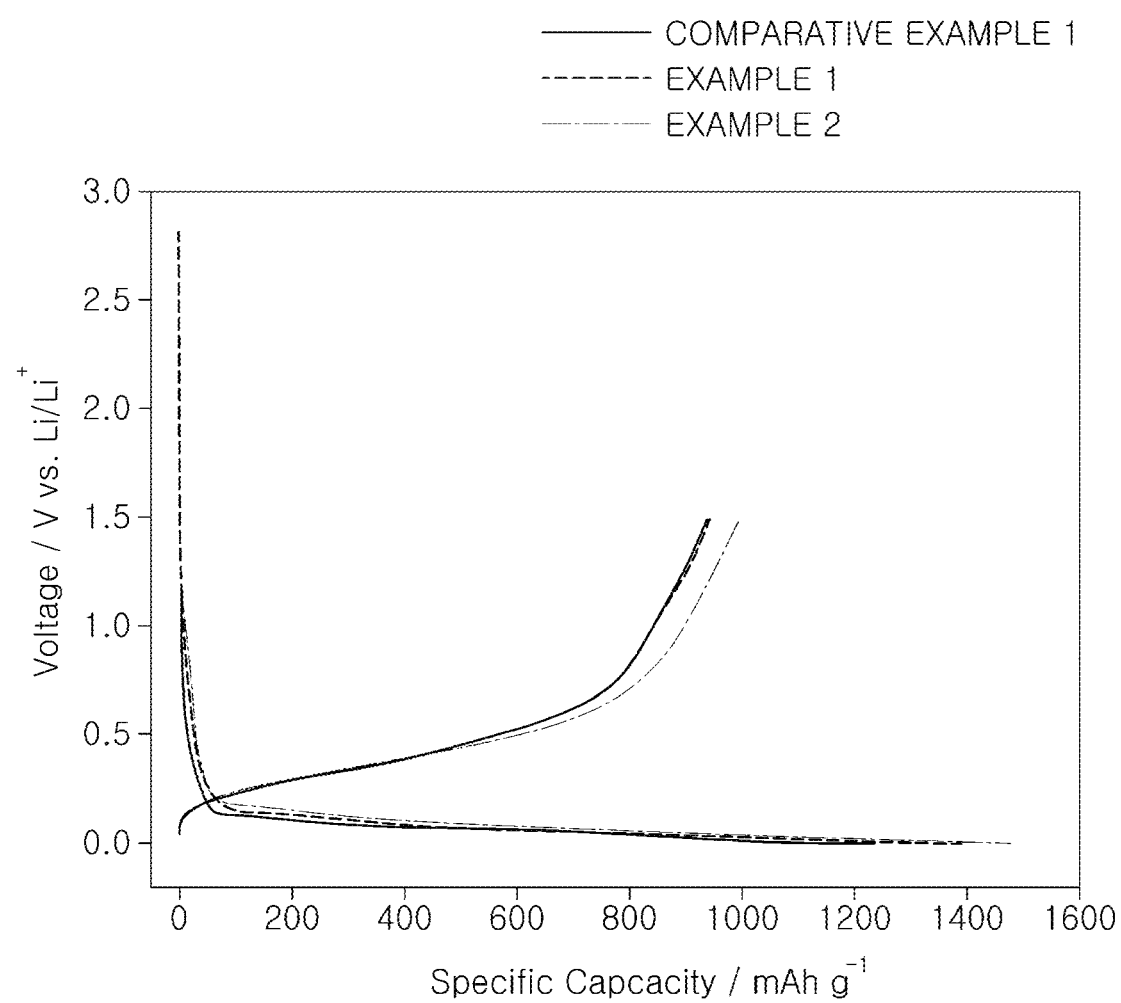
FIGS. 4A and 4B are graphs showing comparison in electrochemical properties between the anode active materials manufactured according to Comparative Example and Examples.
Figure 4B:
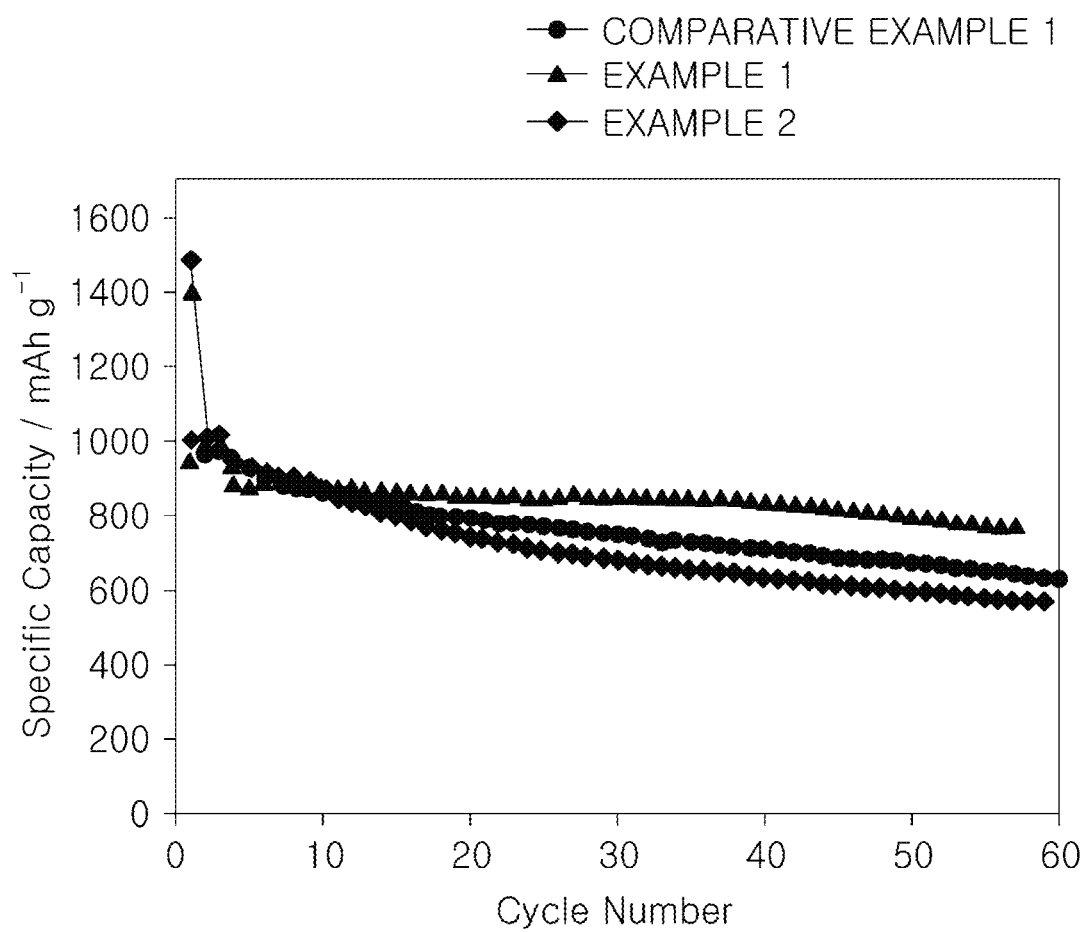
Figure 5A:
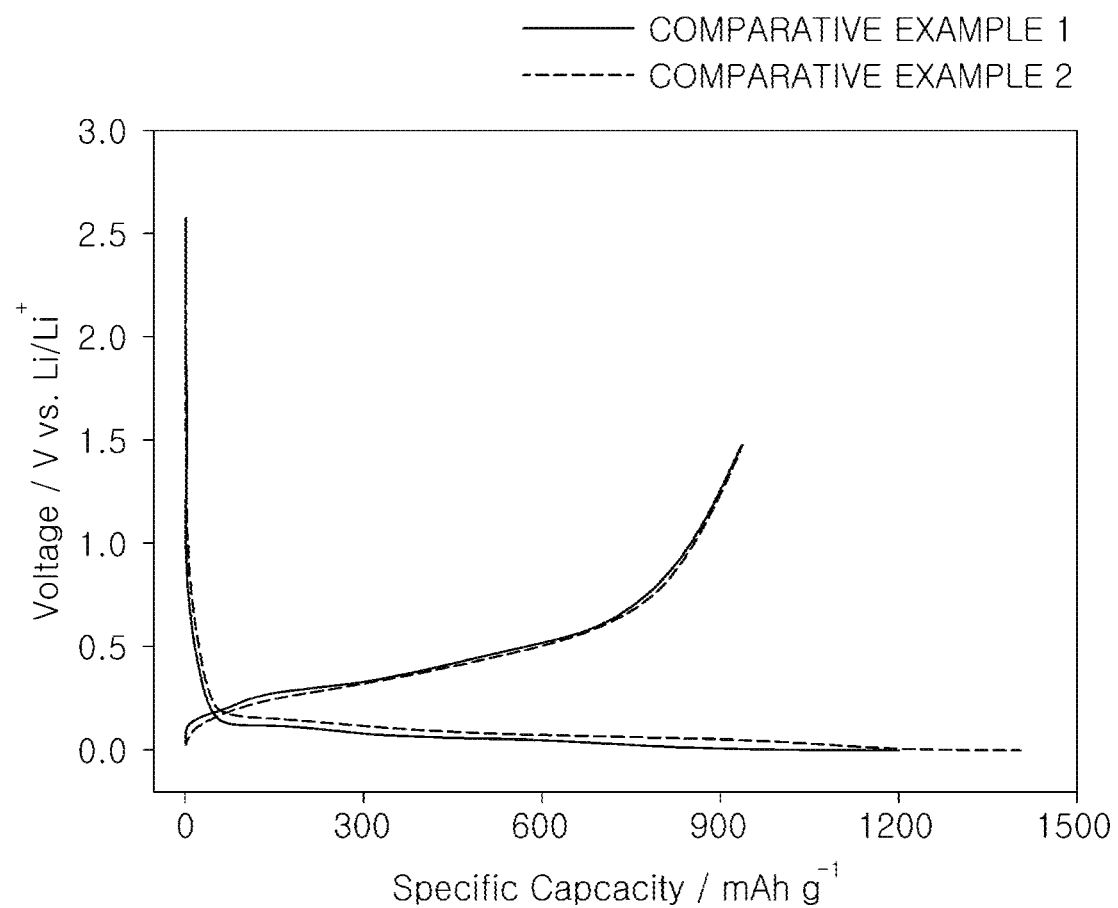
FIGS. 5A and 5B are graphs showing comparison in electrochemical properties between anode active materials manufactured according to Comparative Example 1 and Comparative Example 2.
Figure 5B:
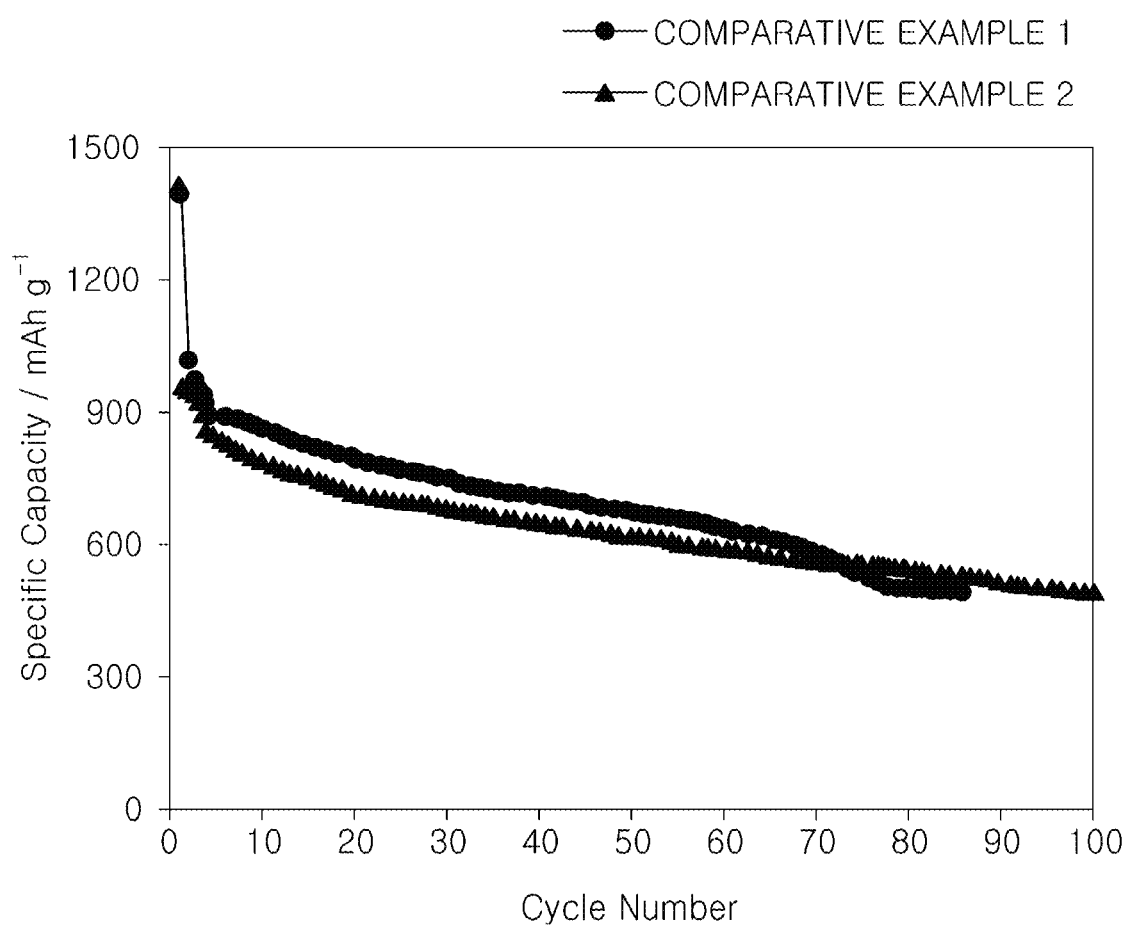
Figure 6:
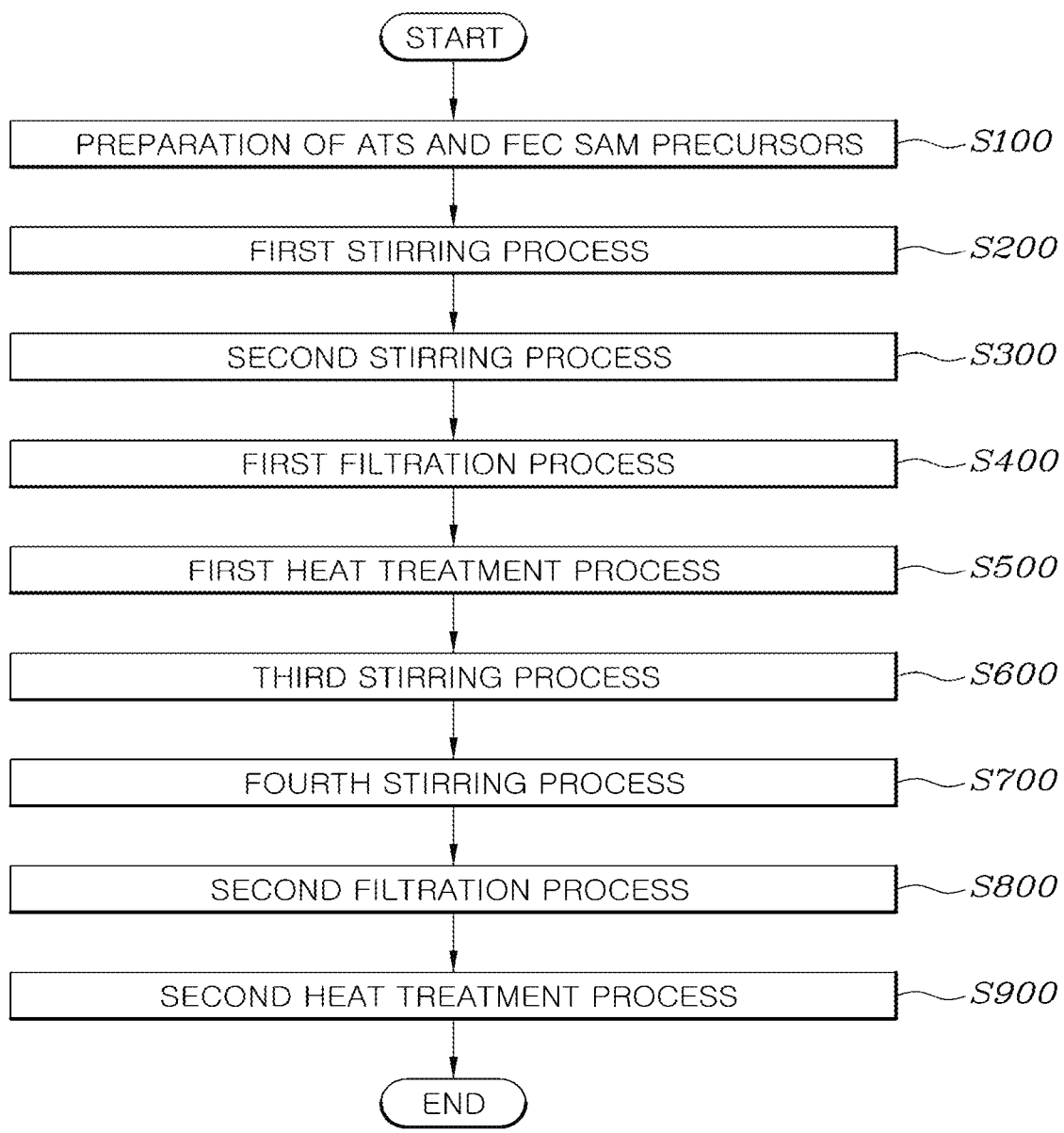
FIG. 6 is a flowchart showing a dip-coating method of manufacturing an anode material for lithium secondary batteries.
Figure 7:
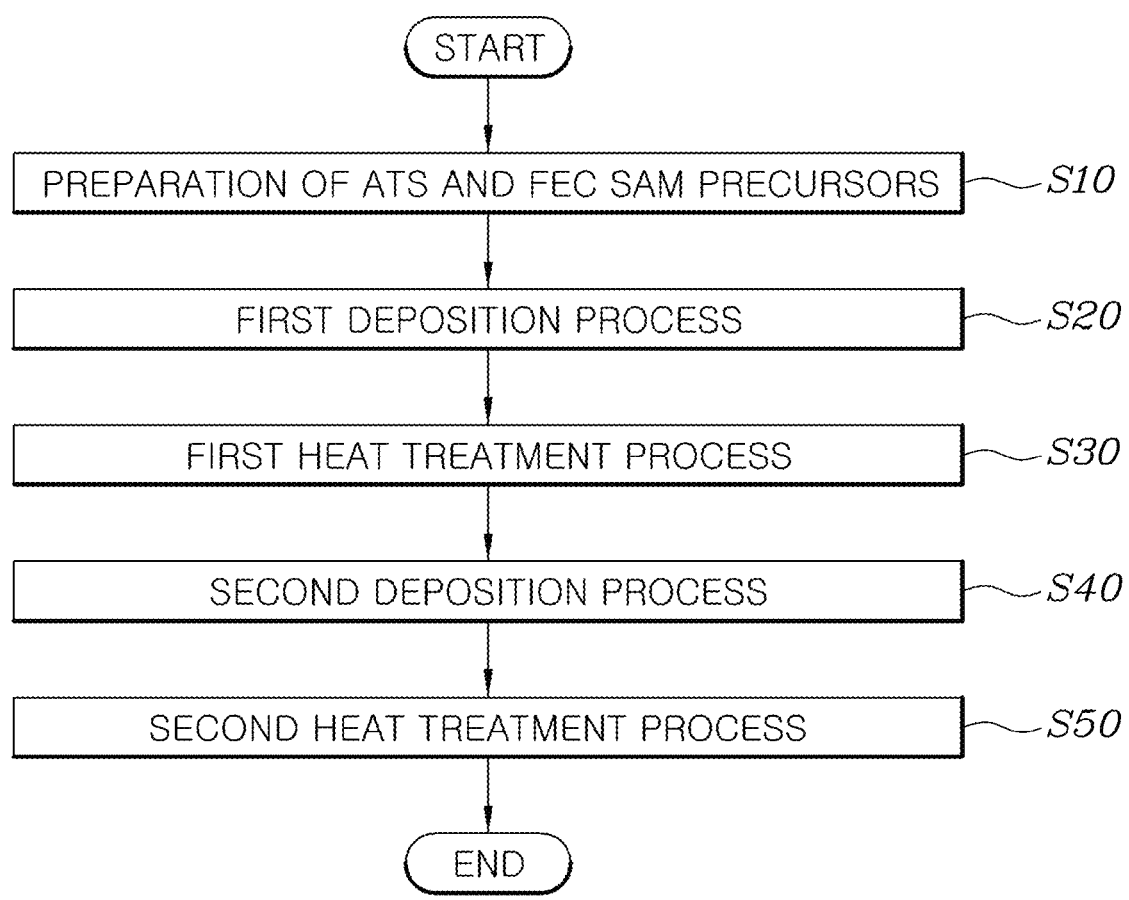
FIG. 7 is a flowchart showing a vapor deposition method of manufacturing an anode material for lithium secondary batteries.

FIG. 1 is a photograph showing comparison between the surfaces of anode active materials manufactured according to Examples before and after SEM photographing, FIG. 2 is a view showing the contact angle of an SAM on each of the surfaces of anode active materials manufactured according to Comparative Example and Examples, FIG. 3 is a graph showing the surfaces of anode active materials according to Comparative Example 1 and Example 1 analyzed using an XPS analysis method, FIGS. 4A and 4B are graphs showing comparison in electrochemical properties between the anode active materials manufactured according to Comparative Example and Examples, FIGS. 5A and 5B are graphs showing comparison in electrochemical properties between anode active materials manufactured according to Comparative Example 1 and Comparative Example 2, FIG. 6 is a flowchart showing a dip-coating method of manufacturing an anode material for lithium secondary batteries, and FIG. 7 is a flowchart showing a vapor deposition method of manufacturing an anode material for lithium secondary batteries.

Deintercalation of lithium ions occurs at an anode constituting a lithium secondary battery at the time of discharging. In the initial stage of development of the lithium secondary battery, lithium metal was mainly used as an anode material; however, lithium metal has very high reactivity with moisture, whereby a stability problem occurred. For this reason, a carbon-based material has been developed, whereby commercialization of the lithium secondary battery has been accelerated. The carbon-based material has advantages in that lithium ions can be intercalated thereinto, the electrical level thereof is very similar to that of lithium ions, and the structure thereof is stably maintained even when intercalation and deintercalation of lithium ions repeatedly occur.

Silicon (Si), which belongs to group 14 of the periodic table, like carbon, is used as another anode material. Si is a metal-based material different from carbon, and has a higher theoretical capacity than the carbon-based material (about 3 times to 5 times the theoretical capacity of the carbon-based material). A device, such as a vehicle, requires a range of 500 km or more on a single charge. Consequently, Si, which has a high theoretical capacity, has attracted attention as the anode material.

When silicon is used as the anode material, intercalated lithium chemically reacts with silicon (lithiation of Si), whereby the lithium is not deintercalated at the time of discharging. As a result, the silicon-based material has lower initial efficiency than the carbon-based material. In addition, when intercalation and deintercalation of lithium ions are repeated, the structure of the silicon-based material is deformed, whereby the lifespan thereof is reduced.

Therefore, development and research to utilize the silicon-based material as the anode material have been actively conducted.

In the present disclosure, a self-assembled monolayer (SAM) is formed on the surface of an Si-based anode active material, whereby electrochemical properties of an Si-based anode material are improved.

An anode material for lithium secondary batteries according to an embodiment of the present disclosure includes an Si-based anode active material and a film layer formed as a double self-assembled monolayer as the result of an amino trimethoxy silane (ATS) SAM precursor and a fluoro ethylene carbonate (FEC) SAM precursor being sequentially bonded to the surface of the Si-based anode active material.

Specifically, ATS refers to a compound having an amino group and including silicon having trimethoxide, and FEC refers to a compound represented by Chemical Formula 2, shown below.

Chemical Formula 2

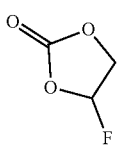

In general, an electrolytic solution of a lithium secondary battery includes lithium salt, an electrolyte solvent, and an additive. Here, the additive serves to form or adjust a solid electrolyte interphase (SEI) at an anode and to prevent overcharging. The SEI is a passivation film or a passivation layer formed as the result of an electrolyte included in the electrolytic solution being deposited or adsorbed on the interphase through a chemical reaction in which the electrolyte contacts a metal, carbon, or oxide electrode and is decomposed at the interphase. The passivation film has very low electron conductivity, whereby electrons cannot pass through the passivation film. However, the passivation film has high conductivity of lithium ions, whereby the passivation film serves as a path along which lithium ions move.

Meanwhile, as mentioned above, in the case in which the silicon-based material is used as the anode material, the silicon-based anode active material is repeatedly expanded and contracted due to repeated intercalation and deintercalation of lithium ions, whereby Si particles are collapsed and an SEI separation phenomenon occurs, and therefore electrochemical performance is deteriorated.

The additive FEC, which is added to the electrolytic solution in a small amount, is known as an effective additive capable of maintaining the performance of an anode. Even though FEC is an effective additive for the anode, the performance of FEC is not guaranteed for a cathode. Consequently, it is necessary to maximally inhibit movement of FEC to the cathode.

In the present disclosure, an ATS SAM precursor is primarily introduced and bonded to the surface of the anode, and an FEC SAM precursor is secondarily bonded to the ATS SAM precursor, whereby it is possible to improve electrochemical properties of a lithium secondary battery having an Si-based anode material applied thereto.

Specifically, an SEI separation phenomenon due to a change in volume of Si may be reduced through strong bonding between Si and SAM, and the effect of FEC on the anode is eliminated by bonding and fixing FEC to ATS SAM, whereby structural stability is improved and thus electrochemical performance is improved.

The ATS SAM precursor is represented by Chemical Formula 1, shown below:

Chemical Formula 1

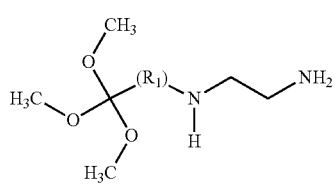

Where $R_1$ indicates a linear or branched alkylene group having a carbon number of 3 to 5.

Here, the alkylene group refers to a bivalent atomic group generated from aliphatic saturated hydrocarbon excluding two hydrogen atoms bonded to two different carbon atoms, and is represented by the Chemical Formula $C_nH_2n$. For example, the "linear or branched alkylene group having a carbon number of 3 to 5" means an alkyl group including carbon atoms having a carbon number of 3 to 5, i.e. —$CH_2CH_2CH_2$—, —$CH_2CH(CH_3)$—, —$CH_2CH_2CH_2CH_2$—, —$CH_2CH(CH_3)CH_2$—, —$CH_2CH_2CH_2CH_2CH_2$—, —$CH(CH_3)CH_2CH_2CH_2$—, —$CH_2CH(CH_3)CH_2CH_2$—, or —$CH_2C(CH_3)_2CH_2$—.

Meanwhile, the Si-based anode active material includes one or more of Si, SiO, and an Si alloy.

The Si-based anode active material has a theoretical capacity (mAh/g) equivalent to about three times that of a carbon-based material, such as natural graphite or artificial graphite, and therefore the energy density of the Si-based anode active material is higher than that of the carbon-based material, whereby it is possible to greatly reduce the size of the lithium secondary battery.

The contact angle of the SAM generated on the surface of the anode material is less than 61.56°.

The SAM has a contact angle of 41.75° when a vapor deposition method is used and has a contact angle of 38.52° when a dip-coating method is used. This means that the SAM is more satisfactorily formed when the dip-coating method, rather than the vapor deposition method, a description of which will follow, is used.

FIG. 6 is a flowchart showing a dip-coating method of manufacturing an anode material for lithium secondary batteries, and FIG. 7 is a flowchart showing a vapor deposition method of manufacturing an anode material for lithium secondary batteries.

Referring to FIGS. 6 and 7, a method of manufacturing an anode material for lithium secondary batteries according to an embodiment of the present disclosure includes a preparation step (S100) of preparing an Si-based anode active material, an amino trimethoxy silane (ATS) SAM precursor, and a fluoro ethylene carbonate (FEC) SAM precursor and a film formation step of sequentially bonding the ATS SAM precursor and the FEC SAM precursor to the surface of the prepared Si-based anode active material to form a double self-assembled monolayer as a film layer.

In the preparation step, the Si-based anode active material is one or more of Si, SiO, and an Si alloy, and the ATS SAM precursor is a compound represented by Chemical Formula 1, where $R_1$ indicates a linear or branched alkylene group having a carbon number of 3 to 5.

FIG. 6 is a flowchart showing a dip-coating method of manufacturing an anode active material.

In the film formation step, the ATS SAM precursor and the FEC SAM precursor may be bonded to each other using the dip-coating method.

Specifically, referring to FIG. 6, the step of forming the film using the dip-coating method includes a first stirring process at S200 of mixing the Si-based anode active material with toluene and stirring the same, and a second stirring process at S300 of mixing the ATS SAM precursor with the mixture stirred in the first stirring process and stirring the same. Next, a first filtration process at S400 includes filtering an excess of toluene from the mixture stirred in the second stirring process. Then, a first heat treatment process occurs at S500, and includes annealing the mixture, from which the excess of toluene is filtered, in a vacuum oven to form a film having the ATS SAM precursor ingredient on the surface of the Si-based anode active material. Next, a third stirring process is performed at S600 of mixing the Si-based anode active material having the film having the ATS SAM precursor ingredient formed on the surface thereof with toluene and stirring the same, and a fourth stirring process is performed at S700 of mixing the mixture stirred in the third stirring process with the FEC SAM precursor and stirring the same. Next, a second filtration process is performed at S800 of filtering an excess of toluene from the mixture stirred in the fourth stirring process, and finally a second heat treatment process is performed at S900 of annealing the mixture, from which the excess of toluene is filtered, in a vacuum oven to form a film having the FEC SAM precursor ingredient on the surface of the Si-based anode active material having the film having the ATS SAM precursor ingredient formed on the surface thereof.

Meanwhile, in the film formation step, the ATS SAM precursor and the FEC SAM precursor may be bonded to each other using the vapor deposition method.

Referring to FIG. 7, the step of forming the film using the vapor deposition method includes a first deposition process at S20 of depositing the ATS SAM precursor ingredient on the surface of the Si-based anode active material under a vacuum condition, a first heat treatment process at S30 of annealing the Si-based anode active material having the ATS SAM precursor ingredient deposited on the surface thereof in a vacuum oven to form a film having the ATS SAM precursor ingredient on the surface of the Si-based anode active material, a second deposition process at S40 of depositing the FES SAM precursor ingredient on the surface of the Si-based anode active material having the film having the ATS SAM precursor ingredient formed on the surface thereof under a vacuum condition, and a second heat treatment process at S50 of annealing the Si-based anode active material having the FEC SAM precursor ingredient deposited on the surface thereof in a vacuum oven to form a film having the ATS SAM precursor ingredient and the FEC SAM precursor ingredient sequentially deposited on the surface of the Si-based anode active material.

Hereinafter, an anode material manufactured using a method of manufacturing an anode material for lithium secondary batteries according to the present disclosure will be described in detail.

Example 1—Manufacture of Anode Using Dip-Coating Method

Toluene and an SiO anode active material were mixed and stirred for 1 hour, and then 3 mM of 3-(2-aminoethylamino)-propyltrimethoxysilane represented by Chemical Formula 3 below, as an ATS SAM precursor, was added to the mixture and stirred for 1 hour. Subsequently, an excess of toluene was filtered, and the mixture, from which the excess of toluene was filtered, was annealed in a vacuum oven at 130° C. for 1 hour to form a film having the ATS SAM precursor ingredient on the surface of the anode active material.

The anode active material having the ATS SAM film formed on the surface thereof was mixed with toluene and stirred for 1 hour, and then 3 mM of an FEC SAM precursor was added to the mixture and stirred for 1 hour. Subsequently, an excess of toluene was filtered, and the mixture, from which the excess of toluene was filtered, was annealed in the vacuum oven at 130° C. for 1 hour such that a film having the FEC SAM precursor ingredient was formed on the surface of the ATS SAM to manufacture an anode.

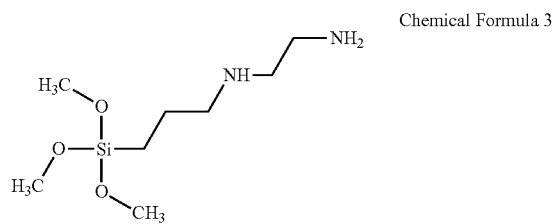

Chemical Formula 3

Example 2—Manufacture of Anode Using Vapor Deposition Method

An SiO anode active material was prepared using a Petri dish having a capacity of 86 ml as a reaction receptacle under a vacuum condition, 0.5 ml of 3-(2-aminoethylamino)-propyltrimethoxysilane represented by Chemical Formula 3 above, as an ATS SAM precursor, was injected into the reaction receptacle such that the ATS SAM precursor was deposited on the SiO anode active material, and annealing was performed in a vacuum oven at 130° C. for 1 hour to form a film having the ATS SAM precursor ingredient on the surface of the anode active material.

Subsequently, 0.5 ml of an FEC SAM precursor was injected into the SiO anode active material having the ATS SAM precursor film formed thereon in the reaction receptacle, deposition was performed under a vacuum condition, and annealing was performed in the vacuum oven at 130° C. for 1 hour such that a film having the FEC SAM precursor ingredient was formed on the surface of the ATS SAM to manufacture an anode.

Comparative Example 1

Untreated SiO was uses as an anode active material.

Comparative Example 2

(3-aminopropyl)trimethoxysilane represented by Chemical Formula 4 below was used as an ATS SAM precursor, unlike Example 1.

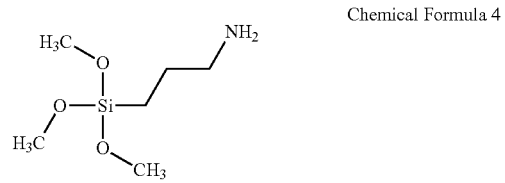

Chemical Formula 4

Hereinafter, electrochemical properties of the anode active materials manufactured according to Examples and Comparative Examples will be described.

FIG. 1 is a photograph showing comparison between the surfaces of the anode active materials manufactured according to Examples before and after SEM photographing, FIG. 2 is a view showing the contact angle of the SAM on each of the surfaces of the anode active materials manufactured according to Comparative Example and Examples, and FIG. 3 is a graph showing the surfaces of the anode active materials according to Comparative Example 1 and Example 1 analyzed using an XPS analysis method.

Referring to FIG. 1, it can be seen that the surfaces of the SiO anode active materials were reformed using the dip-coating method and the vapor deposition method. Referring to FIG. 2, it can be seen that the contact angle between the anode active material and the SAM was smaller when the dip-coating method was used than when the vapor deposition method was used, whereby the dip-coating method was suitable for forming the monolayer. In addition, referring to FIG. 3, it can be seen from XPS analysis that electrons discharged from F1s on the surface of the anode active material, which was not found in Comparative Example 1, were detected, whereby the FEC was satisfactorily bonded to the ATS SAM.

FIGS. 4A and 4B are graphs showing comparison in electrochemical properties between the anode active materials manufactured according to Comparative Example and Examples. Lifespan characteristics were measured under the following conditions.

A mixture including SiO/Gr, SFG6L, and PAA mixed in a ratio of 8:1:1 was used as the anode active material, measurement was performed at 1 C=900 mA/g, a mixture including 1M LiPF6 EC and DEC mixed in a ratio of 1:1 was used as an electrolytic solution, a cut-off condition was 0.005 to 1.5 V, and measurement was performed in the state in which 0.05 C charging and 0.1 C discharging was performed during a first cycle, 0.1 C charging and 0.1 C discharging was performed during a second cycle and a third cycle, and 0.2 C charging and 0.2 C discharging was performed during a fourth cycle and subsequent cycles.

Referring to FIGS. 4A and 4B, it can be seen that the discharge capacity of Example 1 was lower than the discharge capacity of Example 2 but the lifespan characteristics of Example 1 were higher than those of Example 2 and Comparative Example 1.

Also, it can be seen that the lifespan characteristics of Example 2 were lower than those of Example 1 and Comparative Example 1 but the initial capacity of the Example 2 was higher than those of Example 1 and Comparative Example 1.

FIGS. 5A and 5B are graphs showing comparison in electrochemical properties between the anode active materials manufactured according to Comparative Example 1 and Comparative Example 2. This is provided to measure electrochemical properties of the ATS SAM+FEC SAM depending on the length of a carbon chain.

Meanwhile, lifespan characteristics were measured under the following conditions.

A mixture including SiO, SFG6L, and PAA mixed in a ratio of 8:1:1 was used as the anode active material, measurement was performed at 1 C=900 mA/g, a mixture including 1M LiPF6 EC and DEC mixed in a ratio of 1:1 was used as an electrolytic solution, a cut-off condition was 0.005 to 1.5 V, and measurement was performed in the state in which 0.05 C CC CV (0.02 C) charging and 0.1 C discharging were performed during a first cycle, 0.1 C CC CV (0.02 C) charging and 0.1 C discharging were performed during a second cycle and a third cycle, and 0.2 C CC CV (0.05 C) charging and 0.5 C discharging were performed during a fourth cycle and subsequent cycles.

Referring to FIGS. 5A and 5B, it can be seen that the charge capacity of Comparative Example 2 was similar to that of Comparative Example 1 but there was a great difference therebetween in terms of discharge capacity and that the lifespan characteristics of Comparative Example 2 were excellent but the initial resistance of Comparative Example 2 was large. This may be interpreted as meaning that, for an ATS SAM precursor having a short carbon chain, the density of the carbon chain is high due to high packing density of a dense alkyl chain group caused by the short carbon chain, whereby deintercalation of Li+ ions is different and thus resistance is increased. In addition, an electron tunneling phenomenon through the short SAM occurs, whereby electrons move out of the film not via an electric wire. As a result, side reaction in the electrolytic solution is induced, whereby stability of the battery may be reduced.

In consideration thereof, the carbon chain of the ATS is preferably composed of a propyl or longer group, as in Examples.

FIG. 6 is a flowchart showing a dip-coating method of manufacturing an anode material for lithium secondary batteries, and FIG. 7 is a flowchart showing a vapor deposition method of manufacturing an anode material for lithium secondary batteries. A method of manufacturing an anode material for lithium secondary batteries including, as a film layer, a double self-assembled monolayer formed by sequentially bonding an amino trimethoxy silane (ATS) SAM precursor and a fluoro ethylene carbonate (FEC) SAM precursor to the surface of an Si-based anode active material may be performed using the two methods described above. Referring to FIG. 2, it can be seen that the SAM is more satisfactorily formed when the dip-coating method is used.

As is apparent from the above description, according to an embodiment of the present disclosure, FEC is bonded to an ATS SAM of an anode, whereby it is possible to prevent FEC from causing a side reaction at a cathode, and therefore it is possible to prevent a decrease in lifespan and efficiency of a secondary battery.

Although the preferred embodiments of the present disclosure have been described above with reference to the accompanying drawings, those skilled in the art will appreciate that the present disclosure can be implemented in various other embodiments without changing the technical ideas or features thereof.

The invention claimed is:

1. An anode material for lithium secondary batteries, the anode material comprising:
   an Si-based anode active material; and
   a film layer formed as a double self-assembled monolayer as a result of an amino trimethoxy silane (ATS) SAM precursor and a fluoro ethylene carbonate (FEC) SAM precursor being sequentially bonded to a surface of the Si-based anode active material.

2. The anode material according to claim 1, wherein the ATS SAM precursor is a compound represented by the chemical formula:

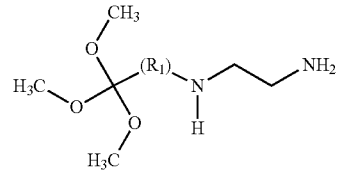

where, $R_1$ indicates a linear or branched alkylene group having a carbon number of 3 to 5.

3. The anode material according to claim 1, wherein the Si-based anode active material is one or more of Si, SiO, and an Si alloy.

4. The anode material according to claim 1, wherein a contact angle on a surface of the anode material is less than 61.56°.

5. A method of manufacturing an anode material for lithium secondary batteries, the method comprising:

a preparation step of preparing an Si-based anode active material, an amino trimethoxy silane (ATS) SAM precursor, and a fluoro ethylene carbonate (FEC) SAM precursor; and a film formation step of sequentially bonding the ATS SAM precursor and the FEC SAM precursor to a surface of the prepared Si-based anode active material to form a double self-assembled monolayer as a film layer.

6. The method according to claim 5, wherein in the preparation step, the Si-based anode active material is one or more of Si, SiO, and an Si alloy, and the ATS SAM precursor is a compound represented by the chemical formula:

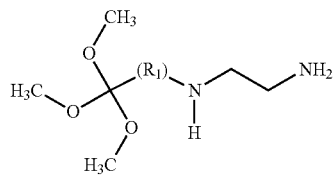

where, $R_1$ indicates a linear or branched alkylene group having a carbon number of 3 to 5.

7. The method according to claim 5, wherein, in the film formation step, the ATS SAM precursor and the FEC SAM precursor are bonded to each other using a dip-coating method.

8. The method according to claim 7, wherein the film formation step comprises:

a first stirring process of mixing the Si-based anode active material with toluene and stirring the same;

a second stirring process of mixing the ATS SAM precursor with the mixture stirred in the first stirring process and stirring the same;

a first filtration process of filtering an excess of toluene from the mixture stirred in the second stirring process;

a first heat treatment process of annealing the mixture, from which the excess of toluene is filtered, in a vacuum oven to form a film having an ATS SAM precursor ingredient on the surface of the Si-based anode active material;

a third stirring process of mixing the Si-based anode active material having the film having the ATS SAM precursor ingredient formed on the surface thereof with toluene and stirring the same;

a fourth stirring process of mixing the mixture stirred in the third stirring process with the FEC SAM precursor and stirring the same;

a second filtration process of filtering an excess of toluene from the mixture stirred in the fourth stirring process; and a second heat treatment process of annealing the mixture, from which the excess of toluene is filtered, in a vacuum oven to form a film having an FEC SAM precursor ingredient on the surface of the Si-based anode active material having the film having the ATS SAM precursor ingredient formed on the surface thereof.

9. The method according to claim 5, wherein, in the film formation step, the ATS SAM precursor and the FEC SAM precursor are bonded to each other using a vapor deposition method.

10. The method according to claim 9, wherein the film formation step comprises:

a first deposition process of depositing an ATS SAM precursor ingredient on the surface of the Si-based anode active material under a vacuum condition;

a first heat treatment process of annealing the Si-based anode active material having the ATS SAM precursor ingredient deposited on the surface thereof in a vacuum oven to form a film having the ATS SAM precursor ingredient on the surface of the Si-based anode active material;

a second deposition process of depositing an FES SAM precursor ingredient on the surface of the Si-based anode active material having the film having the ATS SAM precursor ingredient formed on the surface thereof under a vacuum condition; and a second heat treatment process of annealing the Si-based anode active material having the FEC SAM precursor ingredient deposited on the surface thereof in a vacuum oven to form a film having the ATS SAM precursor ingredient and the FEC SAM precursor ingredient sequentially deposited on the surface of the Si-based anode active material.

* * * * *